April 18, 1961    J. F. JOHNSTON ET AL    2,980,367
LINKED INERTIAL BALANCE FOR TAB
Filed June 11, 1959      2 Sheets-Sheet 2
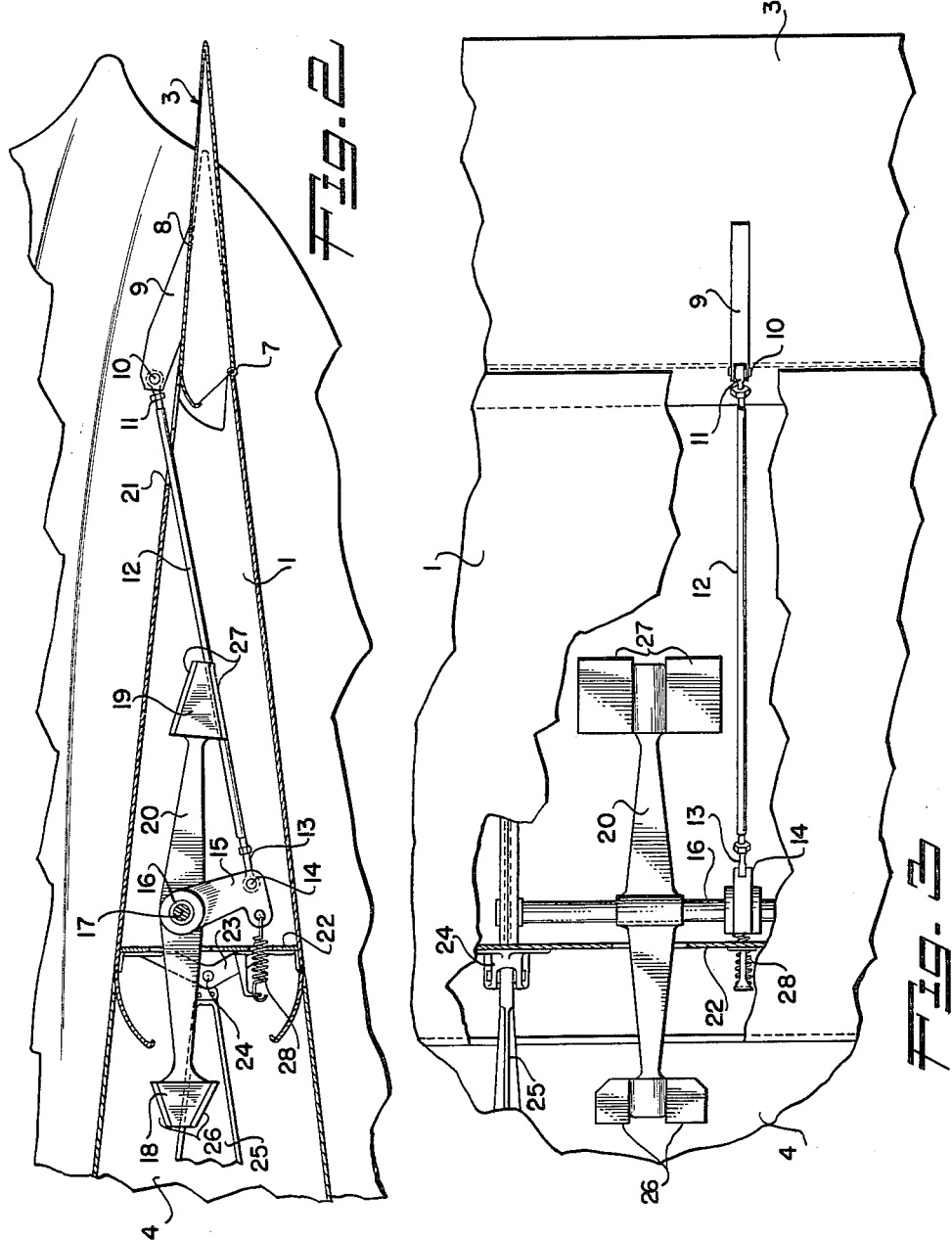
INVENTORS
J. FORD JOHNSTON
EDWARD EVERETT POSTEL
By
Agent

United States Patent Office 2,980,367
Patented Apr. 18, 1961

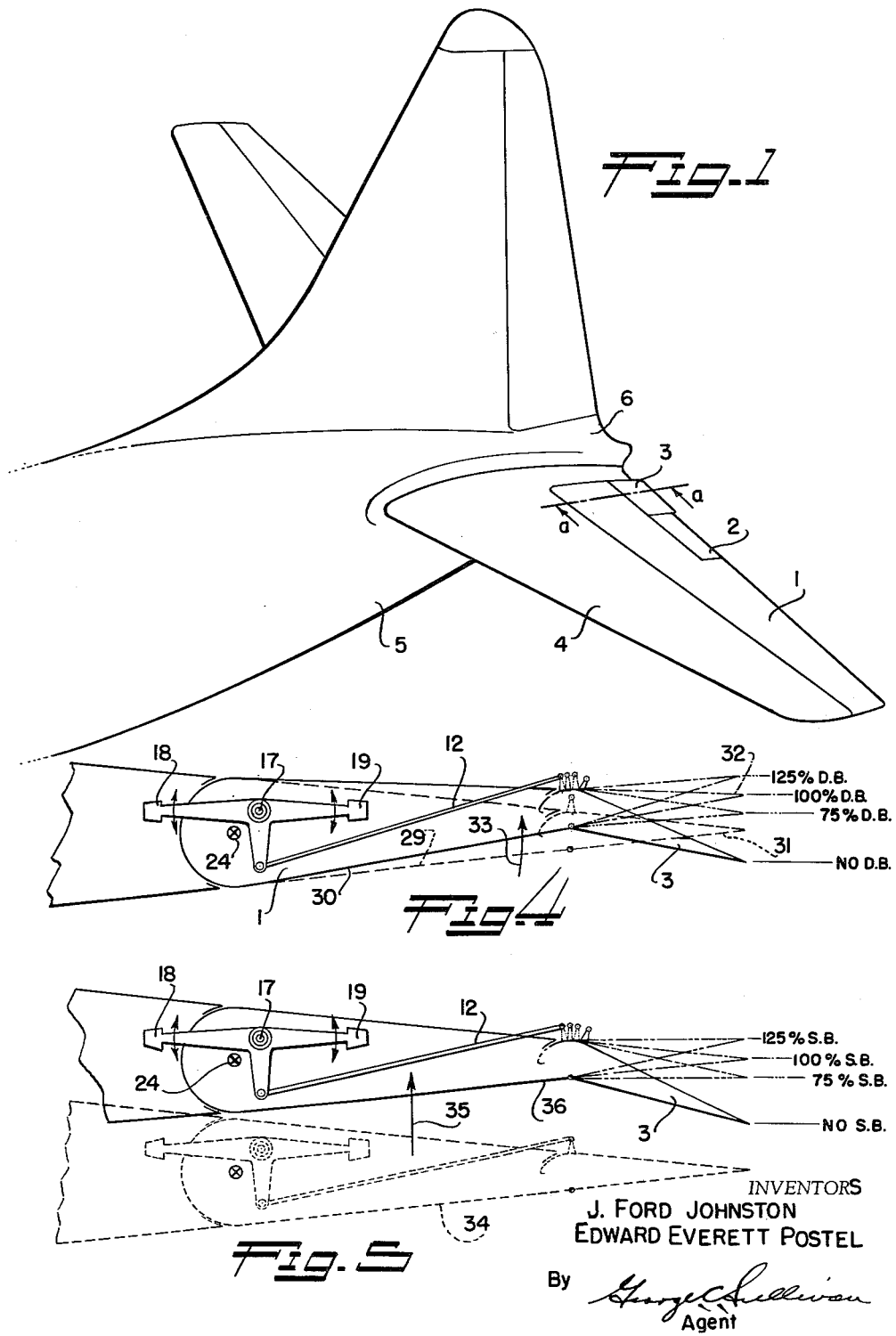

2,980,367

LINKED INERTIAL BALANCE FOR TAB

J. Ford Johnston, Burbank, and Edward Everett Postel, Sherman Oaks, Calif., assignors to Lockheed Aircraft Corporation, Burbank, Calif.

Filed June 11, 1959, Ser. No. 819,721

3 Claims. (Cl. 244—75)

This invention relates to aircraft-surface tabs, and more particularly to tabs having independently selected amounts of static and dynamic balance.

Heretofore, aircraft control surface tabs have employed weights attached to the tab to provide balance when necessary to eliminate flutter. Typically, these weights are carried on an arm, attached to the tab, which will place the weight forward of the tab hinge line. However, to obtain full or adequate dynamic balance by this means may result in static overbalance. Such static overbalance tends in many cases to promote flutter and instability of the system under dynamic conditions of flight. In order to overcome this problem, a linked inertia according to the present invention may be employed which will permit the amount of static balance to be selected independently of the selected amount of dynamic balance, thereby providing adequate dynamic balance without having excessive static balance.

It is therefore, an object of the present invention to provide a balance for an aircraft control tab which will permit the amount of static balance to be selected independently of the amount of dynamic balance, or conversely.

It is a further object of the present invention to provide an improved aircraft control surface tab having an inertial balance linked to the tab which will prevent or suppress flutter.

Still another object of the invention is to provide a novel tab hinged to a control surface for improving the stick-free static stability of an airplane.

These and other objects of the invention not specifically set forth above, will be readily apparent from the accompanying description and drawings in which:

Figure 1 is a perspective view of the empennage of an airplane showing an elevator tab system employing the present invention.

Figure 2 is a sectional view taken along line a—a of Figure 1 showing the linked inertial balance for a tab.

Figure 3 is a sectional plan view of the device of Figure 2.

Figure 4 is a diagrammatic view of the present invention showing typical motions of the tab for various degrees of dynamic balance.

Figure 5 is a diagrammatic view of the present invention showing typical motions of the tab for various degrees of static balance.

The embodiment of the invention chosen for illustration comprises a tab having a linked inertial balance used in conjunction with the main trim tab in the elevator system located aft of the airplane's horizontal stabilizer. Each elevator has a force-linked tab coupled through a soft spring to the linkage regulating the position of the main trim tab. The linked balance weight swings on a pivot aft from the stabilizer rear beam. The inertial balance for each surface is only that required to prevent flutter.

Looking now at Figure 1, the elevator system comprises an elevator control surface 1, a main trim tab 2, and a force-linked tab 3 aft of the horizontal stabilizer 4, all of which are located on the empennage 5 of the airplane. The elevator system has two force-linked tabs 3 one on each side of the elevator root 6. The basic use of the force-linked tab is to improve the stick-free static stability of the airplane. A further use is to add its trim effect to that of the elevator trim tab 2.

As shown in Figure 2, the force-linked tab 3 pivots on hinge 7. Attached to the upper surface 8 of the force-linked tab 3 is tab horn 9, to which is connected shaft 10, which in turn carries eye bolt 11. A push-rod 12 connects the eye bolt 11 to a second eye bolt 13 which turns on shaft 14. Shaft 14 is attached to crank arm 15 which is fixedly connected to shaft 16 and turns therewith. Shaft 16 turns on pivot 17 about which turns the linked balance of the control surface. The balance comprises counterweights 18 and 19 located at opposite ends of bar 20; this bar is free to turn through an arc about pivot 17. The balance assembly comprising counterweights 18 and 19, and crank arm 15, is located within the elevator 1. The push-rod 12, linking the balance assembly to the tab, passes through opening 21 in the upper skin of the elevator. The tab horn 9 and the adjacent end of the push-rod 12 may be enclosed within a suitable covering, not shown, for decreasing drag during flight.

The elevator 1 is supported on beam 22, which in turn is attached to support-member 23 and turns on hinge 24. Hinge 24 is supported by elevator hinge support 25, which is suitably attached to the structure of the horizontal stabilizer 4. As can be seen, the elevator is free to turn on hinge 24.

The upper and lower planar surfaces of counterweight 18 are faced with rubber cushions 26. Similarly, the surfaces of counterweight 19 are faced with rubber cushions 27. These cushions serve to protect the balance mechanism against damage which might otherwise occur if the counterweight should ever strike the interior of the elevator 1 and/or horizontal stabilizer 4.

The force-linked tab may be made to float on a spring 28 through a suitable linkage regulated by the position of the main trim tab 2 to match the tab aerodynamic hinge moment produced by the combination of dynamic pressure and elevator position. Since the spring 28 is adjusted in conjunction with the main trim tab 2, the force-linked tab position would also be influenced by the trim tab 2 setting. It should be understood, however, that this spring coupling is not a necessary feature of the invention; rather, it is shown as merely typical of its use in conjunction with a second or main trim tab. In the embodiment described, the initial positioning of the force-linked tab 3 is accomplished by movement transmitted by spring 28 connected to the force-linked tab through the linkage comprising crank arm 15, push-rod 12, and tab horn 9. An additional positioning of the force-linked tab is achieved by the balancing of counterweight 18 and counterweight 19 about pivot 17 under the influence of gravity and inertial forces. Whether linked to a second or main tab or if used as the sole trim tab, the degree of static and dynamic balance is determined by adjusting the relative and absolute weights of the two counterweights 18 and 19.

The conditions of dynamic and static balance and unbalance of the force-linked tab may be expressed by the following relationships where:

$S_p$ = unbalance of linked balance about its pivot
$I_p$ = moment of inertia of linked balance about its pivot
$S_t$ = unbalance of tab about its hinge line
$I_t$ = moment of inertia of tab about its hinge line
$a$ = moment arm between tab hinge line 7 and pivot 10 of the connecting link 12
$b$ = moment arm between pivot 17 of the balance and pivot 14 of the connecting link 12

$d$ = moment arm between control surface hinge line 24 and the tab hinge line 7

$e$ = moment arm between control surface hinge line 24 and the pivot 17 of the balance; $e$ is zero if balance pivot 17 is attached to the stabilizer rather than to the elevator $I_t + dS_t$ = dynamic unbalance of tab $S_t$ = static unbalance of tab $I_p \frac{a}{b} + S_p \frac{a}{b}$ = dynamic balance provided by linked bal.

$S_p \frac{a}{b}$ = static balance provided by linked bal.

Percent dyn. bal.
$$= 100 \times \frac{\text{dyn. bal. provided by linked balance}}{\text{dyn. unbalance of tab}}$$

Percent static bal.
$$= 100 \times \frac{\text{static bal. provided by linked bal.}}{\text{static unbalance of tab}}$$

Looking now at Figure 4, there is shown a diagrammatic view showing typical positions of the force-linked tab relative to the position of the elevator for various amounts of dynamic balance under dynamic conditions. As the elevator 1 is angularly accelerated about the control surface hinge line 24 from an initial given position 29 shown in dotted outline to a new given position 30 shown in solid outline, the force-linked tab 3 will move from its given position 31 to a new position 32 assuming that the selected amount of dynamic balance incorporated into the device is 100%. Balance pivot 17 may be coincident with hinge 24 if desired; however, mounting convenience will usually dictate the configuration shown. If the weights and the relationship of counterweight 18 as compared with counterweight 19 are selected to provide 125% dynamic balance, then tab 3 will move in the direction of arrow 33 relative to the movement of elevator 1 which displaced from position 29 to position 30. And, conversely, the tab 3 will move in a direction opposite that of arrow 33 relative to the movement of elevator 1 when the elevator 1 is accelerated upward about hinge 24 when less than 100% dynamic balance is incorporated into the linked balance mechanism.

Looking now at Figure 5, there is shown in diagrammatic form an analysis of the operation of the force-linked tab under various conditions of static balance in a manner similar to that shown in connection with Figure 4 for conditions of dynamic balance. An initial condition 34 of equilibrium is shown in dotted outline; upon being rectilinearly accelerated upward in the direction of arrow 35 to a new position 36 as shown in solid outline, a new position of the tab relative to the elevator may be achieved as determined by the percentage of static balance incorporated into the linked balance of the device. Again, the tab will rotate with its trailing edge moving in the direction of the acceleration of the elevator-stabilizer system when rectilinearly accelerated assuming more than 100% static balance, will follow the motion of the elevator for 100% static balance and will move relatively in a direction opposite that of the elevator for less than 100% static balance. The reaction of the tab when the elevator is being rotationally accelerated may be set to differ from the reaction when the elevator is rectilinearly accelerated by selection of the dynamic balance relative to the static balance.

In a typical case, the best linked tab balance may be shown to be 75% static balance with 125% dynamic balance. Percentages of dynamic balance as compared with static balance may be independently selected in accordance with the previously listed formulas to provide the required amount of each necessary to provide stability and flutter-free operation under all flight conditions.

Various modifications of the present invention are contemplated by those skilled in the art without departing from the spirit and scope of the invention as hereinafter defined by the appended claims.

What is claimed and desired to be secured by United States Letters Patent is:

1. In a control surface for an aircraft, a tab pivotable about a hinge line on said control surface, first and second counterweights having independently selectable masses carried at opposite ends of a bar, said bar being rotatable about a pivot having the first and second counterweights on opposite sides of the pivot axis, means linking said bar to said tab including an arm extending downward midway between the counterweights and a push rod connected between the arm and tab for transferring motion of said bar to said tab to provide independently selectable amounts of dynamic balance and static balance to said tab as determined by the selected masses of said first and second counterweights.

2. In a control surface as defined in claim 1, a second control surface for said aircraft, said second control surface supporting said pivot whereby movement of said second control surface is modified by said tab.

3. In an elevator for an aircraft, a trim tab angularly positionable about a hinge line on said elevator, a pair of inertial weights pivotably supported on said elevator having one weight of the pair on opposite sides of the pivot axis to be responsive to gravity and inertial forces experienced by said aircraft, linkage means for connecting said trim tab to said inertial weight, means for spring biasing the weights via the linkage means, said linkage means transferring motion from said inertial weight to said trim tab for positioning said trim tab thereby modifying the trim of said elevator in response to said gravity and inertial forces.

References Cited in the file of this patent

UNITED STATES PATENTS

| 2,368,059 | White | Jan. 23, 1945 |
| 2,400,017 | Miles | May 7, 1946 |
| 2,859,925 | Gerin | Nov. 11, 1958 |